US005728342A

United States Patent [19]
Wirt et al.

[11] Patent Number: 5,728,342
[45] Date of Patent: Mar. 17, 1998

[54] METHOD OF MAKING AN INVISIBLE INSTRUMENT PANEL OR DASHBOARD AIRBAG COVER DOOR

[75] Inventors: W. Gary Wirt, Clinton Township; Patrick G. Jarboe, Shelby Township, both of Mich.

[73] Assignee: Morton International, Inc., Chicago, Ill.

[21] Appl. No.: 607,650

[22] Filed: Feb. 27, 1996

Related U.S. Application Data

[63] Continuation of Ser. No. 348,057, Dec. 1, 1994, abandoned.

[51] Int. Cl.$^6$ .................................................. B29C 45/14
[52] U.S. Cl. .................................. 264/259; 264/275
[58] Field of Search .......................... 264/250, 254, 264/255, 259, 267, 268, 275, 328.13, 325.14; 156/242, 245

[56] References Cited

U.S. PATENT DOCUMENTS

| | | | |
|---|---|---|---|
| 3,123,403 | 3/1964 | Hood | 297/412 |
| 4,120,516 | 10/1978 | Takamatsu et al. | 280/728 |
| 4,246,213 | 1/1981 | Takamatsu et al. | 264/46.7 |
| 4,852,907 | 8/1989 | Shiraki et al. | 280/731 |
| 4,952,351 | 8/1990 | Parker et al. | 264/46.4 |
| 4,975,229 | 12/1990 | Kita et al. | 264/46.6 |
| 5,002,307 | 3/1991 | Heidorn | 280/731 |
| 5,060,971 | 10/1991 | Nanbu et al. | 280/728 |
| 5,072,967 | 12/1991 | Batchelder et al. | 280/732 |
| 5,082,310 | 1/1992 | Bauer | 280/732 |
| 5,096,221 | 3/1992 | Combs et al. | 280/732 |
| 5,110,647 | 5/1992 | Sawada et al. | 428/43 |
| 5,131,678 | 7/1992 | Gardner et al. | 280/732 |
| 5,143,401 | 9/1992 | Zushi | 280/731 |
| 5,154,444 | 10/1992 | Nelson | 280/732 |
| 5,172,931 | 12/1992 | Baba et al. | 280/728 |
| 5,172,932 | 12/1992 | Watanabe et al. | 280/731 |
| 5,174,602 | 12/1992 | Nakayama et al. | 280/743 |
| 5,183,615 | 2/1993 | Zushi | 264/313 |
| 5,222,760 | 6/1993 | Rafferty | 280/728 |
| 5,238,264 | 8/1993 | Barnes | 280/732 |
| 5,248,532 | 9/1993 | Sawada et al. | 428/35.2 |
| 5,277,443 | 1/1994 | Grant et al. | 280/732 |
| 5,292,150 | 3/1994 | Watanabe et al. | 280/728 B |
| 5,316,335 | 5/1994 | Gray et al. | 280/728 B |
| 5,344,183 | 9/1994 | Hersman et al. | 280/728 B |

FOREIGN PATENT DOCUMENTS

| | | |
|---|---|---|
| 0495188 | 7/1992 | European Pat. Off. |
| 2703011 | 9/1994 | France |
| 2703012 | 9/1994 | France |

*Primary Examiner*—Angela Y. Ortiz
*Attorney, Agent, or Firm*—George W. Rauchfuss, Jr.; Gerald K. White

[57] ABSTRACT

An invisible cover door for an inflatable passive passenger restraint is provided in an interior trim structure of an automotive vehicle for deployment of an airbag therethrough. The low pressure insert injection molding of the cover door into the interior trim structure, such as an instrument panel or dashboard or door panel structure, produces an invisible cover door with tear propagation lines that are undetectable to a vehicle occupant and that do not "show" or mar or otherwise affect the aesthetic appearance of the outer trim surface of the instrument panel or dashboard. Such invisible doors which require only two tear propagation lines can be provided.

4 Claims, 2 Drawing Sheets

5,728,342

METHOD OF MAKING AN INVISIBLE INSTRUMENT PANEL OR DASHBOARD AIRBAG COVER DOOR

This Application is a continuation of application Ser. No. 08/348,057, filed Dec. 1, 1994, now abandoned.

FIELD OF THE INVENTION

This invention relates to a cover door for an airbag module in an automotive vehicle instrument panel or dashboard or door panel and more particularly to such a cover door that has invisible tear propagation lines that are undetectable and do not mar the appearance of the instrument panel or dashboard or door panel. The invention also relates to a cover door for such an airbag module that can, if desired, require only two tear propagation lines and to a process for producing such cover doors.

BACKGROUND OF THE INVENTION

Safety restraint systems which self-actuate from an undeployed to a deployed state without the need for intervention by the operator, i.e. passive restraint systems, and particularly those passive restraint systems incorporating inflatable bags or cushions commonly referred to as airbags, have been devised for automotive vehicles. In such system, one or more airbags are stowed in respective storage areas within the passenger compartment of the vehicle. Upon actuation, the one or more airbags are deployed out into the vehicle passenger compartment through a respective opening or openings in the vehicle interior.

Vehicular inflatable restraint systems generally include multiple crash sensors generally positioned about or mounted to the frame and/or body of the subject vehicle and serve to sense sudden decelerations by the vehicle. Upon detection of a sudden deceleration, such as in a collision, the airbag or airbags are rapidly inflated and deployed in positions to cushion the driver and/or passengers from injury-causing contact with the interior structure of the vehicle.

In general, an airbag for the protection of a front seat passenger, i.e. a passenger side airbag, is typically mounted in a storage compartment behind the instrument panel or dashboard of the vehicle. Such airbags are normally housed in an uninflated and folded condition to minimize space requirements.

Such airbags are generally stowed out of sight, thereby reducing the potential for intentional and unintentional tampering therewith. In the normal operation of the vehicle, prior to deployment of the airbag, a cover door or some form of closure member covers the opening wherethrough, upon actuation, the airbag is deployed. Consequently the closure is of necessity generally exposed within the interior of the vehicle.

The interior trim structure of vehicles, particularly the trim panel also referred to as the instrument panel or dashboard, wherein the opening for airbag deployment is often desirably located and in which the cover door for this opening is situated, is commonly comprised of several layers including a substrate, an overlying foam padding material, and an outer skin or trim covering.

In the interest of minimizing the visual (i.e. "look") and tactile (i.e. "feel") impressions of the presence of the deployment cover door and the opening associated therewith, it has been generally desired that the cover door be designed to match or otherwise be compatible with the interior design of the vehicle. Unfortunately, due largely to the mechanics normally associated with cover door design and operation, it is frequently difficult to closely match the look and feel of the instrument panel and other trim panel surfaces to the desired extent.

Upon actuation, the cover doors are typically opened as a result of the force exerted thereon by way of the airbag inflating thereagainst. In practice, it is generally desired that deployment of the inflating airbag not be appreciably slowed by resistance of the cover door to opening. That is, the cover door is designed to permit the near instantaneous deployment of the airbag into the passenger compartment. This near instantaneous deployment of the airbag through the cover door is generally made possible by the presence of propagation tear lines in one or more of the substrate layer, foam padding layer and the outer skin layer. Although there have been various attempts to provide such tear propagation lines for the cover door in such a manner that the presence of the door would not "show" or be visible through or detectable in the outer skin layer of the instrument panel or dashboard of the automotive vehicle, these attempts have not been totally successful. In general, such attempts have resulted in cover doors whose presence in the instrument panel or dashboard are evident to or readily detectable by an observer due to the presence of slight to moderate depressions in the outer skin layer of the panel or dashboard corresponding to the location of the invisible tear propagation lines of the cover door. It would therefore be desirable to provide such an invisible cover door with tear propagation lines that do not "show" or are not detectable through the outer skin layer of the instrument panel or dashboard.

As earlier described, the airbag deployment process is of necessity a very rapid process and, at least partially as a result thereof, commonly results in the cover door or doors opening with a large amount of force and energy. The rapidity of the deployment process, if not fully accounted for in the system design, can result in the cover door tearing in an undesired and/or uncontrolled manner. Undesired and/or uncontrolled tearing of the closure in turn can result in the cover door breaking into or forming separate pieces which can then act as projectiles which would be capable of damaging or hurting vehicle occupants. Fragmentation associated with cover door opening can be especially pronounced with respect to foam padding material from the trim structure in the area adjacent the airbag deployment cover door. Additionally, the inclusion of a layer of foam padding in a cover door itself, so as to approximate the feel provided by the foam of the trim structure, can prove troublesome as the opening of such a closure could result in fragmentation of the closure foam material.

Thus, an additional need exists for an efficient and economical arrangement for providing a cover door in an interior trim structure of an automotive vehicle for the deployment of an airbag therethrough. Preferably, such an arrangement minimizes the visual and/or tactile impression of the presence of the cover door and both the airbag deployment opening and airbag thereunder and which also does not result in significant fragmentation and projection of such fragments into the passenger compartment upon the opening thereof.

SUMMARY OF THE INVENTION

An invisible or undetectable cover door for an inflatable passive restrain in the interior trim structure of an automotive vehicle for deployment of an airbag therethrough is provided by low pressure insert molding of the cover door into the interior trim structure portion of the vehicle. Such an invisible cover door is provided with propagation tear lines that do not "show" or mar or otherwise affect the aesthetic appearance of the outer trim surface of the instrument panel or dashboard or door panel. Additionally, such invisible cover doors can be provided which require only two tear propagation lines instead of the three or four tear propagation lines usually required. Also according to this invention, such invisible or undetectable cover doors can be provided at the free or open edge of the vehicle interior trim structure.

BRIEF DESCRIPTION OF THE DRAWINGS

For a further understanding of the invention and preferred embodiments thereof, reference may be made to the following drawings taken in conjunction with the following description of exemplary embodiments. In the accompanying drawings, in which like reference numbers indicate common elements in the various figures.

DETAILED DESCRIPTION OF THE INVENTION

While the invention is described hereinafter with particular reference to a cover door for a passenger side frontal airbag assembly for automotive vehicles, including vans, pick-up trucks and automobiles, it is to be appreciated and understood that the invention is also applicable to cover doors located in other automotive trim panels, such as, for example, door panels for side impact airbag assemblies.

Figure 1:
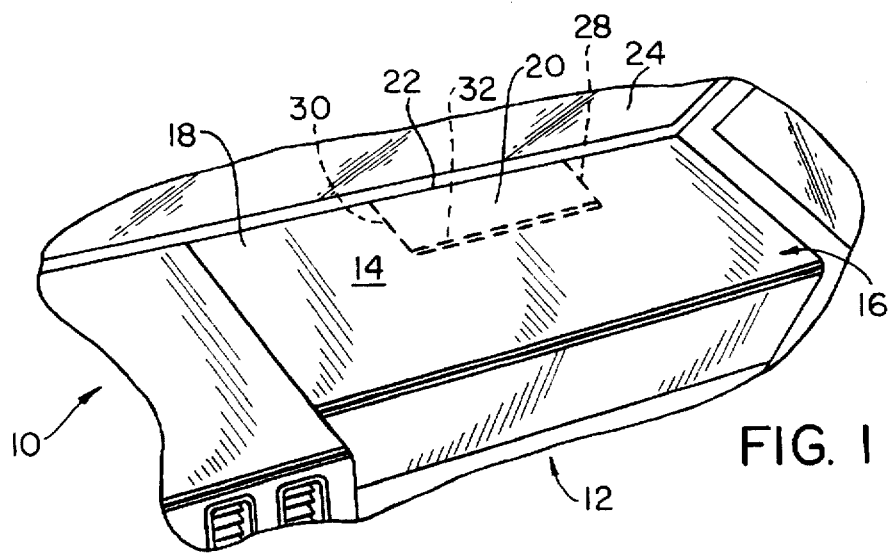
FIG. 1 is a simplified fragmentary perspective view of an automotive interior with an instrument panel or dashboard having an invisible airbag deployment cover door of this invention located at windshield-facing edge of the panel or dashboard.
Figure 2:
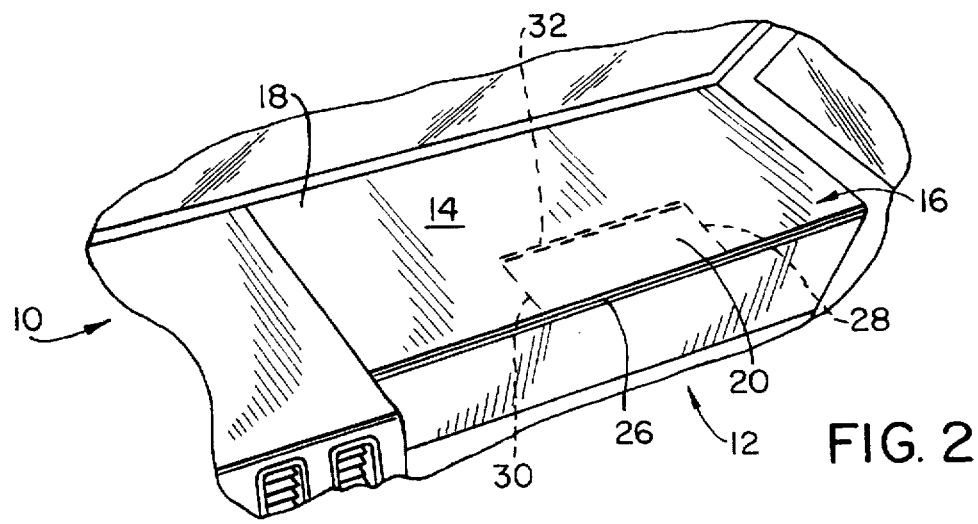
FIG. 2 is a simplified fragmentary perspective view similar to FIG. 1 but with the invisible airbag deployment cover door of the invention located at the passenger-facing free edge of the panel or dashboard.
Figure 3:
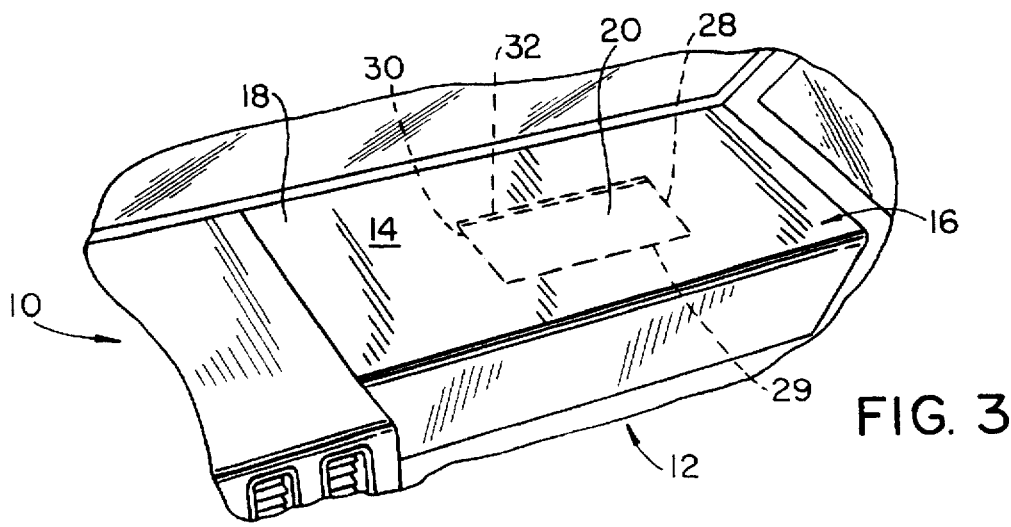
FIG. 3 is a simplified fragmentary perspective view similar to FIG. 1 but with the invisible airbag deployment cover door of the invention centrally located in the top surface of the panel or dashboard.
Figure 4:
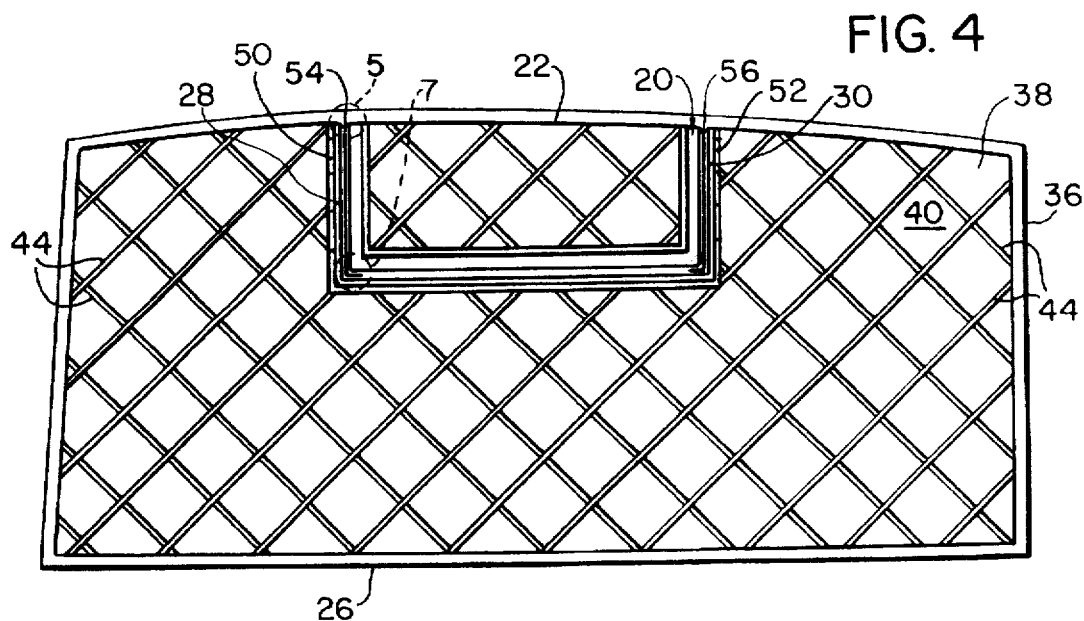
FIG. 4 is a simplified plan view from the underside of the instrument panel or dashboard of FIG. 1 showing the low pressure insert molded cover door.
Figure 5:
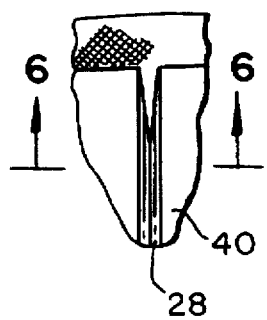
FIG. 5 is a detailed view of the area within circle 5 of FIG. 4.
Figure 6:
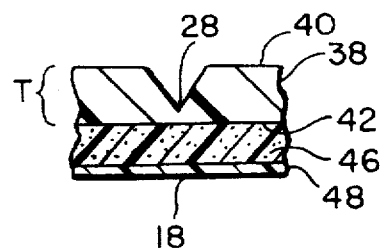
FIG. 6 is a cross-sectional view of the cover door taken along line 6-6 of FIG. 5.
Figure 7:
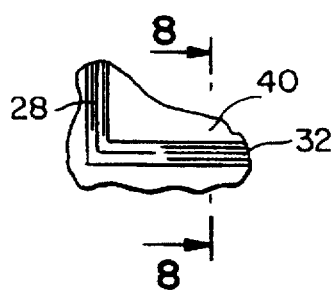
FIG. 7 is a detailed view of the area within circle 7 of FIG. 4.
Figure 8:
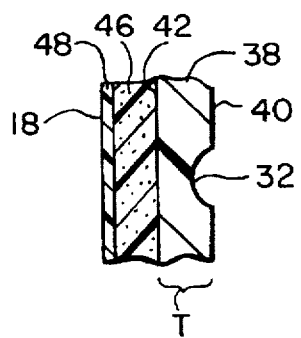
FIG. 8 is a cross-sectional view of the cover door taken along line 8-8 of FIG. 7.

Referring to FIGS. 1 to 3, there is generally illustrated a simplified fragmentary view of an automobile 10 and, more particularly, to a passenger compartment 12 thereof. The passenger compartment 12 includes an instrument panel or dashboard 14 with an outer surface 18 as part of the interior trim structure 16. Typically, a passenger side airbag (not shown) is contained with a housing or receptacle located behind the instrument panel or dashboard 14. For simplicity purposes, the instrument panel or dashboard will be referred to as the dashboard hereinafter.

In the dashboard 14 is contained an airbag deployment cover door 20 shown in dotted outline in FIGS. 1 to 3. Although shown in dotted outline for purposes of illustrating this invention, it is to be understood that the cover door is invisible, that is, its presence or its location is undetectable or nonobservable to an observer from an inspection of the outer or finish surface 18 of dashboard 16. That is, the cover door 20 does not show or otherwise mar the appearance of the outer surface 18 of dashboard 14.

In the embodiments shown in FIGS. 1 and 2, the cover door 20 is located along an edge 22 of the dashboard 14 facing the automobile windshield 24 (FIG. 1) or along an edge 26 of the dashboard 14 facing toward a vehicle occupant or passenger seat (not shown). An advantage of the airbag deployment cover door 20 of this invention being located along either of edges 22 or 26 of the dashboard 14, as shown in FIGS. 1 and 2, is that only two parallel tear propagation seams or lines 28 and 30 are required, as will be described later in reference to FIGS. 4 to 8. A hinge line 32 is provided to allow the deployment cover door 20 to swing open through the dashboard outer surface 18 to permit egress of the airbag upon its deployment. If the cover door is not located along the windshield edge 22 or occupant edge 24 of the dashboard outer surface 18, but is instead more centrally located within the top cover surface 18 of the dashboard as shown in FIG. 3, a third tear propagation line 29 is provided.

Referring to FIGS. 4 to 8 there is illustrated a low pressure insert molded cover door assembly 34 of this invention. The method of producing such a low pressure insert molded cover door assembly 34 is described hereinafter. The cover door assembly comprises an automotive trim panel 36 which in the illustrated embodiment is a dashboard panel 14 of FIGS. 1 and 2. The trim panel 36 comprises on its underside a one piece molded substrate member 38 and on its outer or upper side a thin flexible trim or finish or skin layer 48 with an intermediate foam layer 46 being located between substrate 38 and trim layer 48. Substrate member 38 has a lower surface 40 and an upper Surface 42 adjacent the foam layer 46. Any suitable number of strengthening or reinforcing ribs 44 may be integrally molded into lower surface 40 for providing desired structural stability to the automotive trim panel 36. Although not illustrated, it will be appreciated that the trim panel 36 may have additional layers of material present in addition to substrate 38, foam layer 46 and skin layer 48. For example, a woven or non-woven fabric layer may be situated between substrate member 38 and foam layer 46 to provide for assisting in or for increasing the bonding of the substrate member to the foam layer during the low pressure insert molding formation of the trim panel and for preventing undesired tearing and fragmentation of the foam and outer skin layers.

Trim or finish skin layer 48 is generally a decorative layer of leather or a vinyl, acrylonitrite-butadiene-styrene (ABS) or thermoplastic polyolefin or polyurethane elastomer providing the decorative or aesthetic outer surface 18 of the automotive trim panel, such as a dashboard, instrument panel or door panel. Foam layer 46 is generally a foamed polyurethane or polyolefin layer, such as a foamed polypropylene. The substrate member 38 may be formed from, a thermoplastic polyolefin resin, such as, for example, polyethylene or a glass filled thermoplastic polymer such as a glass filled reinforced polyurethane elastomer, or the like.

Molded integrally with the substrate member, in the manner described hereinafter, is a deployment cover door 20 which is invisible and does not show through or mar the appearance of the outer surface 18 of trim layer 48.

Substrate member 38 is molded with tear propagation lines 28 and 30 and hinge 32 to define the deployment cover door 20 if the cover door is located at a peripheral edge 22 or 26 of the trim panel 36. As explained earlier, a third tear propagation line 29 (FIG. 3) would be molded into substrate member 38 if the deployment door cover was located, not at a preferred edge of the panel 36, but centrally within the panel.

If desired, molded substrate member 38 can also be provided with an integrally molded attachment brackets 50 and 52 on opposing peripheral sides of cover door 20 adjacent the tear propagation line 28 and 30 for attaching or anchoring the cover door to a reaction canister of an airbag module assembly (not shown). Such attachment brackets SO and 52 also serve to provide additional structural strength to the automotive trim panel 36. It will be appreciated that brackets 50 and 52 may in fact be a unitary bracket around the perimeter of the cover door.

The tear propagation lines or seams 28, 29 and 30 are generally V-shaped channels or grooves molded into substrate member 38. The depth of such seams or lines in substrate member 38 will generally be from about 20% to slightly less than 100% the thickness T of substrate member 38, i.e. of the distance between the two surfaces 40 and 42 of the substrate member. If the tear seam is a spaced perforation type tear seam, the depth of the seam will extend, at the perforation, to 100% of the thickness T of the substrate member 38. Generally, the thickness of substrate member 38 will be from about 1 to about 2.5 mils, although substrates thicker and thinner than this are contemplated. The hinge 32 is generally a U-shaped channel (FIG. 8) or V-shaped notch molded into substrate member 38. The depth of the hinge channel or notch 32 in substrate member 38 will be significantly less than the depth of the tear propagation seam notches to prevent the hinge from tearing during airbag deployment and opening of the deployment cover door 20. The depth of hinge channel or notch 32 in substrate member 38 will generally be within the range of from about 10 to about 40% of the thickness T of the substrate member. It will be appreciated that selection of the depth of the propagation tear line and the hinge will be dependent, at least in part, upon the thermoplastic material employed for the substrate member 38.

If desired or considered necessary, tear propagation lines may be suitably formed in the foam layer 46, such as by thermoforming. The foam layer 46 generally has a thickness of about 0.5 to 3.5 mm.

When a peripheral side of the invisible deployment cover door 20 is placed at one of the edges 22 or 26 of the trim panel 36, propagation tear lines 28 and 30 may be so formed as to terminate in tear initiation notches 54 and 56 at the place where the propagation tear lines intersect the edges 22 or 26 of the trim panel. Such notches are formed by having the tear lines extend to a depth equal to the thickness T of substrate member 38. These tear initiation notches S4 and 56 are generally V-shaped and serve to initiate tearing of the tear propagation lines 28 and 30 upon deployment of an airbag from an airbag module assembly.

If desired, lower surface 40 of substrate element 38 may be provided with elements forming means for attaching a tether for tethering the cover door to the airbag module for restraining undue movement of the cover door upon airbag deployment. Such tether attachment means may be provided as part of attachment brackets 50 and 52 or be separate elements molded into the lower surface 40 of substrate member 38.

An automotive trim panel with an invisible deployment cover door of this invention as previously described is produced by a low pressure insert injection molding process (LPIIM). In such a LPIIM process, a commercially available laminate of skin or trim layer 48 with foam layer 46, with or without a woven or non-woven fabric layer, is cut to the appropriate size for forming the desired automotive trim panel 36. The cut piece of skin/foam laminate is then placed into and across the cavity side of an appropriate mold. Generally, the cut laminate is hung on appropriate pins in the mold cavity. Alternatively, the cut skin/foam laminate can be mounted in a slotted slide-in frame that is insertable into the mold cavity.

After suitably placing and anchoring the cut skin/foam laminate into the mold cavity, the mold is closed and held closed under a suitable mold clamping pressure of from about 2.5 to about 5 tons. Thereafter, a suitable thermoplastic material for forming substrate member 38 is heated to a suitable melting temperature, e.g. to about 365° F. for a thermoplastic polyolefin material, and injected into the suitably heated core side of the mold at as low a pressure as is reasonably possible to obtain the desired insert injection molded trim panel 36, such as, for example, at a pressure of about 400 to about 600 psi. The injection temperature of certain thermoplastic resins useful for forming the substrate member 38 may be as high as about 540° F. In all cases, however, it is desirable to conduct the injection step at the lowest temperature range possible. Such injection is usually accomplished within a period of about 0.1 to about 0.5 seconds. In order for the injection pressure of the thermoplastic material not to cause recoil of the mold halves, it may be necessary to increase the clamping pressure on the mold during the injection step, such as up to a pressure of about 250 tons. After injection of the thermoplastic material into the mold and allowing cooling thereof for a period of from about 30 to about 60 seconds, the mold clamp pressure is released, the mold opened and the instrument trim panel product is removed and trimmed, if necessary. The core side of the injection mold will have the design or pattern necessary for producing the deployment cover door 20, as previously described, on substrate member 38.

The temperature and pressure conditions of the LPIIM process will depend, at least in part, upon the particular thermoplastic resins employed to form the substrate, the mold spacing, material viscosity and other similar factors. Suitable molding equipment for conducting such low-pressure insert injection molding of an automotive trim panel with invisible deployment cover door is available from Hettinga Equipment Inc. of Des Moines, Iowa.

This low pressure insert injection molding process of bonding a substrate with an invisible deployment cover door to a skin/foam laminate not only produces an invisible cover door that is undetectable or does not "show" or otherwise mar the appearance of the outer surface 18 of trim layer 48 but also produces an invisible deployment cover door in which the possibility of flying debris being directed toward a vehicle occupant during deployment of an airbag module is essentially eliminated or substantially reduced.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A process for producing an automotive trim panel having an airbag deployment cover door permitting egress of an airbag therethrough from an airbag module upon deployment of the airbag, wherein said trim panel comprises (a) an injection molded thermoplastic resin substrate member;

(b) an outer trim layer overlaying said substrate member and forming a finish surface of said panel; and (c) a foam layer intermediate said substrate member and said trim layer; said process comprising:

(1) placing and anchoring a laminate of said outer trim layer and said intermediate foam layer into a cavity side of a mold of a low pressure insert injection molding apparatus;

(2) closing and clamping shut said mold;

(3) injecting molten thermoplastic resin material into a core side of said mold under low pressure and thereafter permitting cooling of said injected thermoplastic resin material thereby forming said substrate member with a plurality of tear propagation lines and a hinge means forming an outline of the airbag deployment cover door in said substrate member and bonding said substrate member to said laminate; and (4) opening the mold and removing therefrom an automotive trim panel in which the tear propagation lines and hinge means forming the outline of an airbag deployment cover door are not visible to an observer of the outer trim layer forming the finish surface of said panel and do not show to said observer as depressions on an outer surface of said outer trim panel;

wherein the molten thermoplastic resin is heated to a temperature of from about 365° F. to about 540° F. for injection into the mold and is injected within a period of from about 0.1 to about 0.5 seconds.

2. A process for producing an automotive trim panel having an airbag deployment cover door permitting egress of an airbag therethrough from an airbag module upon deployment of the airbag, wherein said trim panel comprises (a) an injection molded thermoplastic resin substrate member;

(b) an outer trim layer overlaying said substrate member and forming a finish surface of said panel; and (c) a foam layer intermediate said substrate member and said trim layer; said process comprising:

(1) placing and anchoring a laminate of said outer trim layer and said intermediate foam layer into a cavity side of a mold of a low pressure insert injection molding apparatus;

(2) closing and clamping shut said mold;

(3) injecting molten thermoplastic resin material into a core side of said mold under a pressure of from about 400 to about 600 psi and thereafter permitting cooling of said injected thermoplastic resin material thereby forming said substrate member with a plurality of tear propagation lines and a hinge means forming an outline of the airbag deployment cover door in said substrate member and bonding said substrate member to said laminate; and (4) opening the mold and removing therefrom an automotive trim panel in which the tear propagation lines and hinge means forming the outline of an airbag deployment cover door are not visible to an observer of the outer trim layer forming the finish surface of said panel and do not show to said observer as depressions on an outer surface of said outer trim panel.

3. The process according to claim 2 wherein the molten thermoplastic resin has been heated to a temperature of from about 365° F. to about 540° F.

4. A process for producing an automotive trim panel having an airbag deployment cover door permitting egress of an airbag therethrough from an airbag module upon deployment of the airbag, wherein said trim panel comprises (a) an injection molded thermoplastic resin substrate member;

(b) an outer trim layer overlaying said substrate member and forming a finish surface of said panel; and (c) a form layer intermediate said substrate member and said trim layer; said process comprising:

(1) placing and anchoring a laminate of said outer trim layer of said intermediate foam layer into a cavity side of a mold of a low pressure insert injection molding apparatus;

(2) closing and clamping shut said mold;

(3) injecting, within a period of from about 0.1 to about 0.5 seconds, molten thermoplastic resin material heated to a temperature of from about 365° F. to about 540° F., into a core side of said mold under a pressure of from about 400 to about 600 psi and thereafter permitting cooling of said injected thermoplastic resin material thereby forming said substrate member with a plurality of tear propagation lines and a hinge means forming an outline of the airbag deployment cover door in said substrate member and bonding said substrate member to said laminate; and (4) opening the mold and removing therefrom an automotive trim panel in which the tear propagation lines and hinge means forming the outline of an airbag deployment cover door are not visible to an observer of the outer trim layer forming the finish surface of said panel and do not show to said observer as depressions of an outer surface of said outer trim panel.

* * * * *